Aug. 28, 1951     E. E. LITTLE     2,565,694
MEANS FOR RETAINING COOKING VESSELS
ON COOKING RANGES OR STOVES

Filed Dec. 5, 1947     2 Sheets-Sheet 1

Inventor

*Ellwood E. Little*

By *Fishburn & Mullendore*

Attorneys

Aug. 28, 1951
E. E. LITTLE
2,565,694
MEANS FOR RETAINING COOKING VESSELS
ON COOKING RANGES OR STOVES
Filed Dec. 5, 1947
2 Sheets-Sheet 2
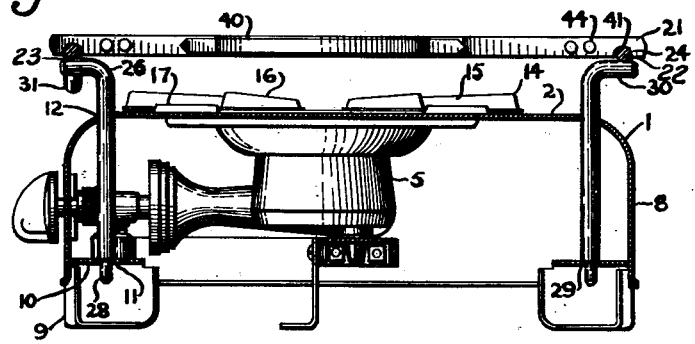
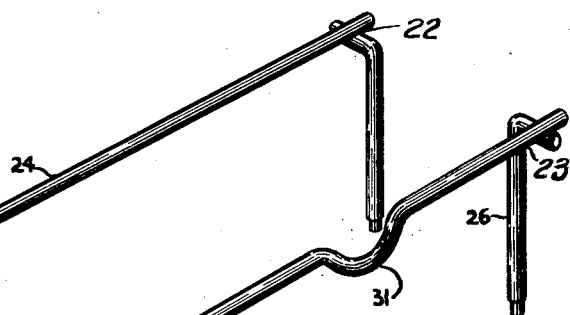
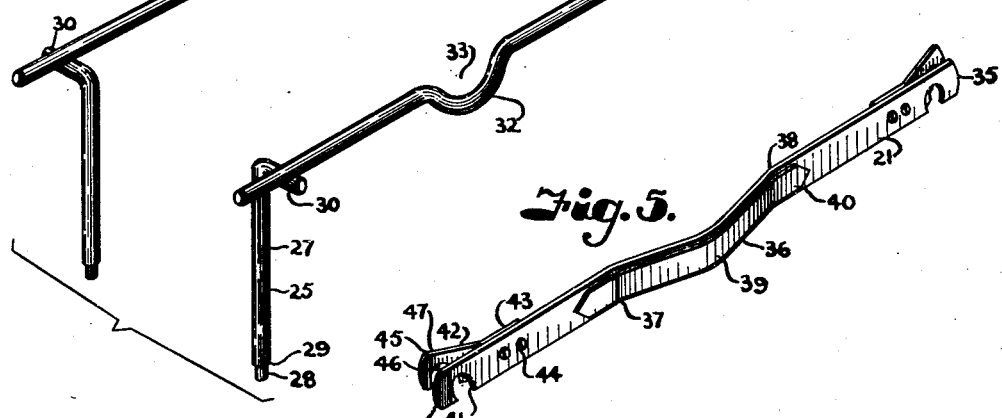
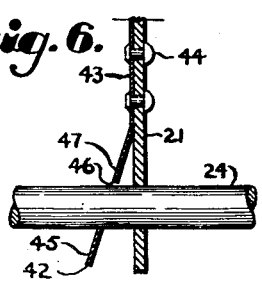
Inventor
Ellwood E. Little
By Fishburn & Mullendore
Attorneys Patented Aug. 28, 1951

2,565,694

UNITED STATES PATENT OFFICE 2,565,694

MEANS FOR RETAINING COOKING VESSELS ON COOKING RANGES OR STOVES

Ellwood E. Little, Wichita, Kans., assignor to The Coleman Company, Inc., Wichita, Kans., a corporation of Kansas Application December 5, 1947, Serial No. 789,820

5 Claims. (Cl. 126—24)

This invention relates to means for retaining cooking vessels on cooking ranges or stoves that are installed in the galley of a boat or other movable conveyance where rolling and pitching motions are apt to cause sliding and tipping of the cooking vessels.

The principal objects of the invention are to provide a cooking vessel holding means which effectively and securely holds various sized vessels over the burner openings or other portions of the cooking top of a range; to provide a cooking vessel holding means that is readily manipulated for gripping engagement with the sides of a cooking vessel and which may be readily released from such engagement without burning the fingers; to provide a vessel holding means that is adapted to grip at a relatively low point on the sides of the vessel so as to offer a minimum of interference with cooking operations; to provide a cooking vessel holding means including relatively light-weight clamping members having friction latches for engaging supporting rails at opposite sides of a cooking top; to provide clamping members in the form of friction latches which automatically grip the supporting rails; and to provide friction latches which permit ready release of the clamping members to permit lifting of the clamping members from the supporting rails when they are not required, thereby leaving the cooking top free and clear of obstructions.

Other objects of the invention are to provide supporting rails for the clamping bars that are readily lifted from position to leave the cooking top free and clear of attaching brackets and the like; to provide at least one of the supporting rails with offset portions to receive handles of the cooking vessels and which cooperate with the clamping members in preventing turning the cooking vessels; and to provide a cooking vessel holding means having parts that are readily cleaned and kept in sanitary condition.

In accomplishing these and other objects of the invention hereinafter pointed out, I have provided improved structure, the preferred form of which is illustrated in the accompanying drawing wherein:

Fig. 3 is a cross section through the stove and vessel holding means on the line 3—3 of Fig. 1.

Fig. 4 is a perspective view of the front and rear supporting rails as they appear when removed from the stove.

Fig. 5 is a perspective view of one of the cooking vessel clamping members.

Fig. 6 is a sectional view through an end of one of the clamping bars, particularly illustrating engagement of the friction latch with its supporting rail.

Figure 1:
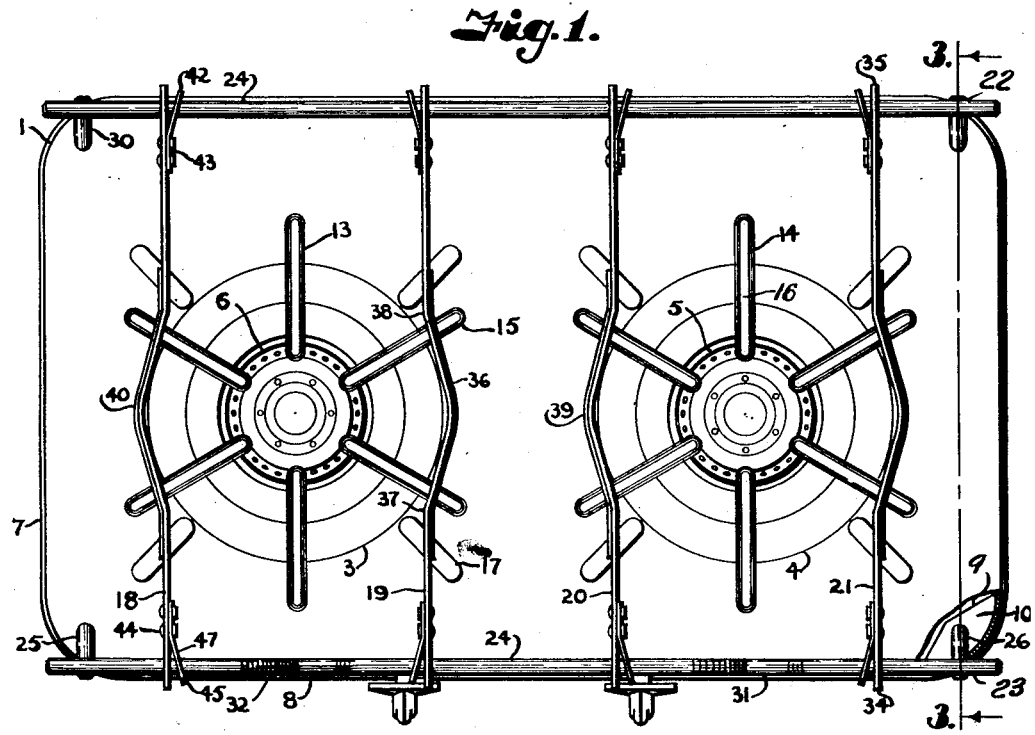
Fig. 1 is a plan view of the cooking top of a range or stove equipped with a cooking vessel holding means embodying the features of the present invention.
Figure 2:
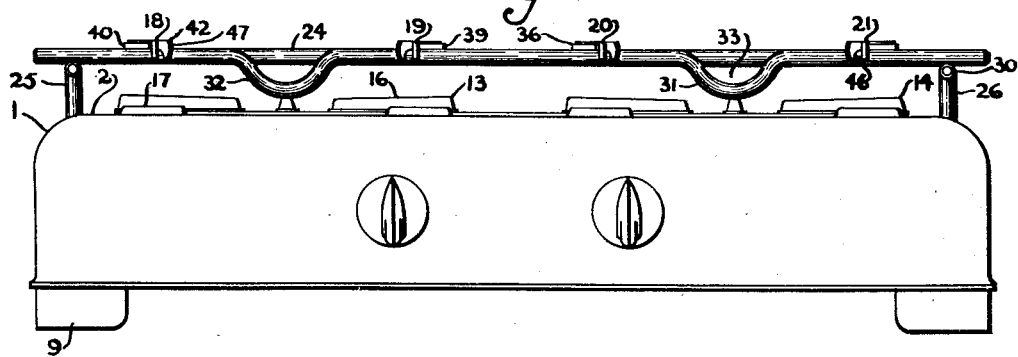
Fig. 2 is a front elevational view, particularly illustrating the offsets in the front supporting rail which are adapted to receive the handles of the cooking vessels such as frying pans or the like that may be placed over the burner openings.

Referring more in detail to the drawings:

1 designates a cooking stove such as used in the galley of a boat or other movable conveyance, the stove illustrated being of the type known as a "hot plate" and which comprises a substantially flat cooking top 2 having openings 3 and 4 registering with fuel burners 5 and 6 that are suitably positioned below the cooking top and enclosed by the sides and end walls 7 and 8 of the stove. Suitably mounted within the corners formed by the side and end walls and positioned in downwardly spaced relation with the cooking top are brackets 9 having web portions 10 arranged horizontally in substantially parallel relation with the cooking top. The web portions of the brackets have apertures 11 registering with apertures 12 that are provided in the cooking top for a purpose later described, the apertures 11 being preferably of smaller diameter than the apertures 12.

The burner openings 4 and 5 are covered by the usual grids 13 and 14, each having radial ribs 15, the upper edges 16 of which may slope downwardly toward the axial center of the burner openings to facilitate centering of the bottom of a cooking vessel over the burner and to accommodate any bulge in the bottom of the vessel so that the vessel is adapted to set firmly on the grids. The cooking top may also be provided circumferentially of the respective burner openings with lugs or bosses 17 to support the cooking vessel or the like above the cooking top when the grids are not in use.

The hot plate thus described may be of any conventional design and specifically forms no part of the present invention with the exception of the apertures 11 and 12 which accommodate the legs of the clamping member supporting rails of the holding members by which cooking vessels are supported from sliding and tipping movement on the cooking top.

The vessel holding means include pairs of vessel clamping members 18, 19, 20 and 21 and front and rear supporting rails 22 and 23. The supporting rails include rod-like bars 24 preferably of circular cross section and of a length to extend along the cooking top. The bars are supported in upwardly spaced relation with the cooking top on legs 25 and 26 which may also be formed of rod-like material to provide vertical or post-like portions 27 that extend downwardly through the openings 12 and which have reduced terminals 28 to pass through the smaller openings 11 of the brackets 9. The terminals thus cooperate with the post portions 27 to provide annular stop shoulders 29 to engage the upper faces of the web portions 10 of the brackets 9 and support the post portions with the upper ends thereof projecting through the cooking top. In order to provide as clear a space as possible over the cooking top, the upper ends of the post portions of the legs terminate in laterally extending arms 30 to connect with the ends of the rod-like members of the rails 24 by welding or the like so that the respective bar and leg members form an integral rail structure. The bar portion of the rear rail member is preferably straight as shown in Fig. 4, but the bar portion of the front rail is preferably provided in register with each of the burner openings with downwardly offset portions 31 and 32 to provide pockets 33 for accommodating handles of the cooking vessels that may be placed over the burner openings. The rail members thus described are readily inserted and removed from the stove and the horizontal rod-like bar portions thereof are rigidly supported co-extensive of the front and rear sides of the cooking top to carry the clamping members 18—19 and 20—21. The clamping members are each of substantially like construction and formed of relatively thin strip material of a length to be positioned transversely across the cooking top with the ends 34—35 thereof projecting over the bar portions of the supporting rails. The intermediate portions of the clamping bars are provided with offsets 36 by bending the bars outwardly as indicated at 37 and 38 to provide outwardly converging clamping portions to tangentially engage the side walls of a cooking vessel, the clamping portions joining on rounding curves 39.

In order that the vessel clamping members may be sufficiently rigid when formed of thin strip material to limit the heat conductivity from the vessel toward the ends of the members, the outer faces of the offset portions are reinforced by embossing the metal or by attaching reinforcing strips 40 to the outer faces of the bars as best shown in Fig. 5. The ends of the bars are provided with downwardly facing notches 41 to engage over the longitudinal bars of the supporting rails.

In order to retain the clamping members in contact with the side wall of the vessel, the ends are provided with friction latches 42 that are formed of flat spring-like material and have attaching portions 43 secured to side faces of the clamping members by fastening devices such as rivets 44. The latch members have outwardly diverging finger grips 45 extending angularly from the plane of the clamping bars and which have downwardly facing notch-like openings 46 adapted to register with the notches 41 when the finger grips of the latches are moved into substantial contact with the ends of the clamping bars.

In using the clamping means for retaining cooking vessels, the front and rear supporting rails are applied with the leg portions thereof extended through the openings 12 so that the reduced ends 28 thereof engage in the openings 11 of the brackets 9. In this position the bar portions of the supporting rails extend parallel along the front and rear sides of the cooking top. When a cooking vessel is placed over one of the burner openings a pair of clamping members 18 and 19 is hooked to the rails, one on each side of the vessel with the notches passing over the bar portion of the supporting rails.

The finger grips of the friction latches are moved into substantially face contact with the side faces of the clamping members so as to register the notches 46 with the notches 41 whereupon the notches are free to pass over the bar portions of the supporting rails. As long as the pressure is maintained on the spring latches, the clamping members may be moved freely along the length of the bars and into and out of contact with the side walls of the vessel. Upon release of the finger grips they spring outwardly to bind the outer side edges 47 of the notches 46 in friction contact with the bar portions of the rails so as to clampingly retain the tangential portions of the clamping members into contact with the cooking vessel on opposite sides thereof and at points spaced on the respective sides of the transverse diameter of the cooking vessel. The cooking vessel is thus firmly supported in concentric relation with the burner opening so that it cannot be dislodged incidental to pitching and rolling movements of the boat or other conveyance in which the stove is installed.

If a cooking vessel is placed over the other burner, the other pair of clamping members may be applied and similarly adjusted to retain the vessel. If the vessels are provided with handles, the handles are positioned so that they extend forwardly and are received in the pockets 33 of the offset portions 36 of the front supporting rail.

Attention is directed to the fact that since the clamping members are formed of relatively thin material and are of substantial length relative to the vessel, the conducted heat is dissipated before it reaches the rail engaging ends of the clamping members so that the ends are kept in relatively cool condition to prevent burning of the fingers and avoid drawing of temper of the spring latches.

To release the vessels, the ends of one of the clamping members are engaged and the spring latches pressed thereagainst so as to register the notches 46 with the notches 41 whereupon the clamping members may be slid along the bar portions of the supporting rails to free the cooking vessel. If no further use is required for that burner, the clamping members may be lifted from the supporting rails so as to leave the underlying portion of the cooking top open, thereby facilitating cleaning of the cooking top. If desired, the supporting rails may be removed and the stove used in the conventional manner.

From the foregoing it is obvious that I have provided clamping means for retaining cooking vessels upon the cooking top of a range so that the vessel is rigidly supported with respect to the burners under rolling and pitching movements of the boat in which the stove is installed. It is also obvious that the clamping members are readily adjusted to engage and support a cooking vessel and that the latch engaging members thereof are readily released to free the cooking vessel for removal from the cooking top. It is also obvious that the supporting rails are readily removed when not needed or for cleaning purposes.

What I claim and desire to secure by Letters Patent is:

1. In combination with a cook stove having a cooking top provided with a burner opening and having pairs of spaced openings at opposite sides of the cooking top, brackets spaced substantially below and underlying said cooking top, said brackets being provided with openings registering with the spaced openings of the cooking top, rails having bar portions extending along the cooking top at opposite sides of the burner opening and having leg portions extending through said registering openings for supporting the bar portions with respect to the cooking top, and clamping members extending transversely between the rails for holding a cooking vessel when placed over the burner.

2. In combination with a cook stove having a cooking top provided with a burner opening and having pairs of spaced openings at opposite sides of the cooking top, brackets under said cooking top provided with openings registering with the spaced openings of the cooking top, rails having bar portions extending along the cooking top at opposite sides of the burner opening and having leg portions extending through said registering openings for supporting the bar portions with respect to the cooking top, clamping members extending transversely between the rails and having ends slidable on said bar portions for movement of the clamping members into and out of contact with a cooking vessel when a cooking vessel is placed over the burner opening, and means on the ends of the clamping members for engaging the bar portion of the rails to hold the clamping members into contact with the vessel, said rails being independent and unconnected with each other except for said clamping members.

3. In combination with a cook stove having a cooking top provided with a burner opening and having pairs of spaced openings at opposite sides of the cooking top and brackets under said cooking top provided with openings registering with spaced openings of the cooking top, rails having bar portions extending along the cooking top at opposite sides of the burner opening and having leg portions extending through said registering openings for supporting the bar portions with respect to the cooking top, clamping members extending transversely between the rails and having ends slideable on said bar portions for movement of said clamping members into and out of contact with a cooking vessel when a cooking vessel is placed over the burner opening, and resilient means on the ends of the clamping members and having rail engaging portions normally spaced from said ends for automatically engaging the bar portion of the rails to hold the clamping members into contact with the vessel and yieldable toward said ends when the clamping members are moved toward the vessel, one of said bar portions having a downwardly offset portion in registry with the burner opening adapted for receiving a handle on said vessel to cooperate with the clamping members in retaining the vessel over the burner opening.

4. In an apparatus of the character described, rails adapted for mounting at the respective opposite sides of a burner opening in the cooking top of a stove, clamping members extending transversely between the rails and having ends provided with downwardly opening notches for engaging over the rails and freely slidable on said rails at the respective sides of a cooking vessel that is adapted to be placed over the burner opening, and spring latches each including a single leaf of spring material fixed to sides of the clamping members which are adapted to engage the sides of the cooking vessel and having an end diverging from said side to which the latches are attached, said ends of the leaves having downwardly diverging notches for engaging over the rails for holding the clamping members in contact with sides of the cooking vessel, said spring latches being releasable under sliding movement of the clamping members along the rails toward the cooking vessel and by pressure applied against said diverging ends to move the clamping members away from the vessel.

5. In an apparatus of the character described, a pair of spaced parallel rails adapted for mounting at opposite sides of a burner opening in the cooking top of a cook stove, and clamping members comprising substantially flat strips having substantially rigid rail engaging ends freely slidable on the rails when the clamping members are moved in either direction into or out of contact with a vessel placed over the burner opening and having single leaf springs fixed to said strips and having rail engaging portions normally spaced from said ends for automatic locking contact with the rails at any point along the length of the rails to prevent movement of the clamping members in one direction and yieldable by pressure applied to move the ends of the leaf springs toward the ends of said strips to release said locking contact and move the clamping members in the opposite direction.

ELLWOOD E. LITTLE.

REFERENCES CITED

The following references are of record in the file of this patent:

UNITED STATES PATENTS

| Number | Name | Date |
| --- | --- | --- |
| D. 124,302 | Chamberlain | Dec. 31, 1940 |
| 1,042,973 | Rugaard | Oct. 29, 1912 |
| 1,434,352 | Jester | Oct. 31, 1922 |
| 1,505,220 | Shay | Aug. 19, 1924 |
| 1,663,438 | Brumbaugh | Mar. 20, 1928 |
| 1,645,466 | Westlake | Oct. 11, 1929 |